United States Patent

[11] 3,569,667

| [72] | Inventor | Edward L. Ryswick |
| --- | --- | --- |
| | | Rochester, N.Y. |
| [21] | Appl. No. | 841,006 |
| [22] | Filed | July 11, 1969 |
| [45] | Patented | Mar. 9, 1971 |
| [73] | Assignee | Varispace Industries, Inc. |
| | | East Rochester, N.Y. |

[54] CONTROL FOR ELECTRIC STRIP HEATER
17 Claims, 2 Drawing Figs.

[52] U.S. Cl. .................................................... 219/243,
219/512, 338/316
[51] Int. Cl. ............................................................. H05b 1/00
[50] Field of Search ............................................. 219/243,
388, 482, 489, 491, 512; 53/33, 39; 338/315, 316,
318; 156/251, 515, 583

[56] References Cited
UNITED STATES PATENTS
| 1,671,300 | 5/1928 | MacDonald et al. .......... | 219/388 |
| --- | --- | --- | --- |
| 2,802,086 | 8/1957 | Fener ............................ | 156/583 |
| 3,283,126 | 11/1966 | Velvel .......................... | 219/243X |

Primary Examiner—J. V. Truhe
Assistant Examiner—C. L. Albritton
Attorney—Cumpston, Shaw and Stephens ABSTRACT: A control for a strip heater supported on a frame uses a lever pivoted on the frame to have a short lever arm engaged by a carriage carrying the movable end of the strip and a long lever arm coupled to an adjustable element in an electric circuit having a variable power output for energizing the strip.

PATENTED MAR 9 1971　　　　　　　　　　3,569,667

INVENTOR.
EDWARD L. RYSWICK
BY Cumpston, Shaw,
and Stephens.

ATTORNEYS

CONTROL FOR ELECTRIC STRIP HEATER

THE INVENTIVE IMPROVEMENT

Previous strip heater controls have used lengthening and shortening of the strip under thermal expansion and contraction to regulate the electric power supplied to the strip, but they consistently concentrated on operating a switch or closing contacts for full interruption of power. Such an arrangement was inaccurate and difficult to adjust and had to rely on small motions of the strip to accomplish power regulation.

The invention aims at increased accuracy, adjustability, and reliability of strip heater controls by several cooperating improvements. Such improvements make the inventive control simple, economical, rugged, and adaptable to existing machinery to provide a strip heater control that is accurate, effective, and reliable.

SUMMARY OF THE INVENTION

The inventive control is applicable to an electric strip heater having a fixed end secured to a supporting frame and a movable end secured to a movable carriage as the strip lengthens and shortens at different temperatures. It includes a lever pivoted on the frame to have a long and a short lever arm, and a bearing member carried on the carriage engages the short lever arm for pivotting the lever as a function of carriage position. An electric circuit for energizing the strip has a variable power output and a movable element for adjusting the power output. The long lever arm of the lever is coupled to the movable element in the electric circuit for positioning the element as a function of the lever position for varying the power output. Also, for some applications, cooling blocks in thermal communication with the strip are arranged with circulating coolants for conducting away heat not transmitted to the material intended to be heated.

THE DRAWINGS

FIG. 1 is a partially schematic elevational view of one preferred embodiment of the inventive strip-heater control; and FIG. 2 is a schematic fragment of an alternative embodiment of the inventive strip-heater control.

DETAILED DESCRIPTION

Figure 1:
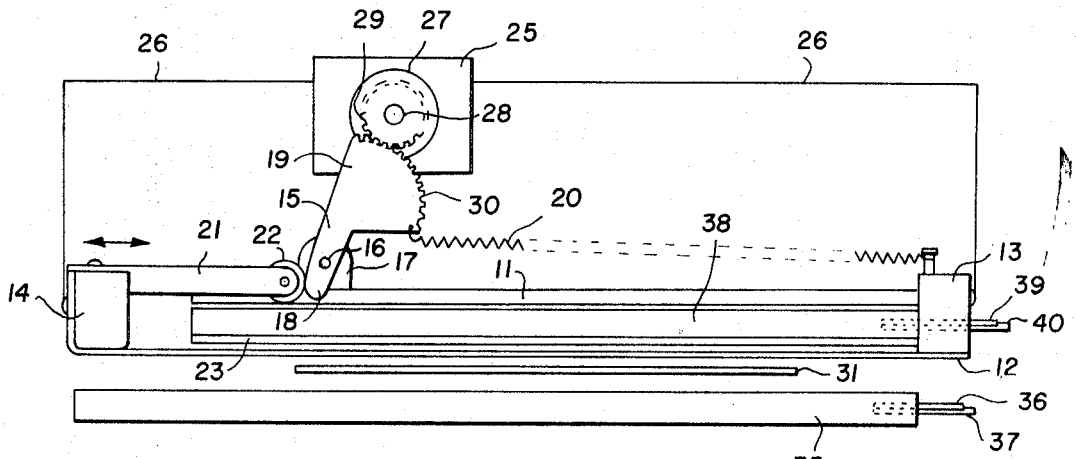

A frame 11 supports heater strip 12 which is secured at its fixed end to a block 13 carried on frame 11. The movable end of strip 12 is secured to carriage block 14 that moves in the direction of the arrows relative to frame 11. An insulation layer 23 is preferably disposed above strip 12. A lever 15 is mounted on pivot 16 on lug 17 carried by frame 11 and includes a short lever arm 18 and a long lever arm 19. A spring 20 biases lever 15 toward clockwise rotation as shown in FIG. 1. A bar 21 carried on carriage block 14 has a rotatable roller 22 engaging short lever arm 18 of lever 15. Thus, tension of spring 20 is applied through short lever arm 18 to roller 22 and bar 21 for biasing carriage block 14 toward tightening of heater strip 12.

Heater control circuit 25 is preferably an extended range, variable-voltage circuit currently available in solid state and popularly known as TRIAX subassembly. Its power output is variable continuously throughout a substantial range and is applied to strip 12 through leads 26. Control circuit 25 includes an adjustable potentiometer 27 that controls the variable power output to strip 12. Potentiometer 27 is adjusted by turning shaft 28 carrying pinion 29 meshed with gear sector 30 on long lever arm 19 of lever 15. Then, as strip 12 lengthens and shortens to move carriage block 14 through a range of positions, this motion is mechanically amplified through long lever arm 19 which is coupled to pinion 29 for translating the motion into turning of shaft 28 to adjust potentiometer 27. This, in turn, varies the power output of control 25 to adjust the energization of strip 12 without any switching or contact erosion.

Material 31 to be heated by strip 12 is preferably arranged under strip 12. The embodiment of FIG. 1 is intended for heating any width of material 31 up to the length of strip 12. However, the end portions of strip 12 that do not engage a particular width of material 31 tend to become overly heated since the heat in such portions is not adequately conducted away. To prevent inaccuracies from this in heat strip arrangements where the heating strip does not contact material to be heated throughout the entire length of the strip, a cooling block 35 is preferably arranged to conduct away excess heat from the unused portion of the strip. Cooling block 35 is arranged under material 31 on the side opposite strip 12 and includes inlet and outlet pipes 36 and 37 for circulating a coolant through block 35. Relative closing motion between frame 11 and block 35 presses strip 12 against material 31 which is supported by block 35, and the portions of strip 12 that do not contact material 31 engage cooling block 35 which conducts excess heat from such portions.

To the same effect, another cooling block 38 with inlet and outlet pipes 39 and 40 is preferably arranged on frame 11 above strip 12 to conduct away any excess heat from unused portions of strip 12. Material fed in the same direction as the heating strip would carry away the heat from the strip throughout its length so that cooling blocks 35 and 38 would not be necessary.

Figure 2:
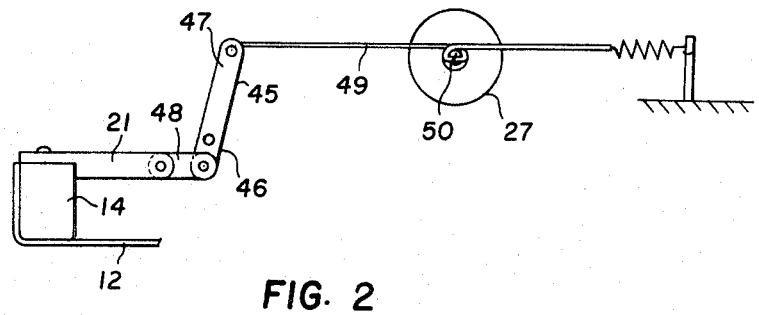

The alternative embodiment of FIG. 2 shows a different coupling between a pivoted lever 45 having a short lever arm 46 and a long lever arm 47 and having its short lever arm 46 coupled through a pivoted connector rod 48 to bar 21 carried on movable carriage block 14 at the free end of strip 12. Movement of carriage block 14 is mechanically amplified through long lever arm 47 which has a band or string 49 in tension between long lever arm 47 and shaft 50 of potentiometer 27 in the variable-power electric circuit. Tension band 49 is wrapped around shaft 50 for turning shaft 50 as long lever arm 47 is moved through a range of positions.

Many other coupling and connecting arrangements are possible between a mechanical amplification lever and an adjustable element such as a potentiometer in a variable-power electric circuit. Eccentrics, cams, toggles, and other devices are available for this. Also, the concepts and features of the inventive control can be adapted to existing equipment in a variety of ways.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will readily understand how available devices and techniques can be made to cooperate with the inventive control depending upon the circumstances of each application.

I claim:

1. A control for an electric strip heater having a fixed end secured to a supporting frame and a movable end secured to a carriage movable relative to said frame as said strip lengthens and shortens at different temperatures, the improvement comprising:
   a. a lever pivoted on said frame to have a long and a short lever arm;
   b. a bearing member carried on said carriage to engage said short lever arm for pivoting said lever as a function of said carriage position;
   c. an electric circuit having a variable power output for energizing said strip;
   d. an element in said circuit being movable for adjusting said power output; and
   e. coupling means connecting said long lever arm and said movable element for positioning said element as a function of said lever position for varying said power output.

2. The control of claim 1 wherein said bearing member includes a roller member engaging said lever.

3. The control of claim 2 wherein said short lever arm has a curved surface engaging said roller.

4. The control of claim 1 wherein said movable element comprises part of a potentiometer in said circuit.

5. The control of claim 1 wherein said coupling means comprises a gear sector on said long lever arm meshed with a pinion arranged for turning said movable element.

6. The control of claim 1 wherein said coupling means comprises a tension band secured to said long lever arm and wrapped around a shaft for turning said movable element.

7. The control of claim 1 including a spring biasing said long lever arm to tension said strip.

8. The control of claim 1 including a block in thermal communication with said strip, said block including means for circulating a coolant through said block.

9. The control of claim 8 wherein said strip is arranged on one side of material to be heated, and said block is arranged on the opposite side of said material to be heated.

10. The control of claim 9 including an additional one of said blocks arranged on the opposite side of said strip from said material to be heated.

11. The control of claim 8 including a spring biasing said long lever arm to tension said strip.

12. The control of claim 11 wherein said bearing member includes a roller engaging a curved surface of said short lever arm.

13. The control of claim 12 wherein said movable element comprises part of a potentiometer in said circuit.

14. The control of claim 13 wherein said coupling member comprises a gear sector on said long lever arm meshed with a pinion arranged for turning said potentiometer part.

15. The control of claim 13 wherein said coupling means comprises a tension band secured to said long lever arm and wrapped around a shaft for turning said potentiometer part.

16. The control of claim 13 wherein said strip is arranged on one side of material to be heated, and said block is arranged on the opposite side of said material to be heated.

17. The control of claim 16 including an additional one of said blocks arranged on the opposite side of said strip from said material to be heated.